United States Patent
Henon et al.

(10) Patent No.: US 12,361,761 B1
(45) Date of Patent: Jul. 15, 2025

(54) SYSTEM AND METHOD FOR ACCESS CONTROL USING LIVENESS DETECTION

(71) Applicant: Wicket, LLC, Las Vegas, NV (US)

(72) Inventors: Yann Henon, Somerville, MA (US); Gennady Livitz, Belmont, MA (US); Samson Timoner, Cambridge, MA (US)

(73) Assignee: Wicket, LLC, Las Vegas, NV (US)

( * ) Notice: Subject to any disclaimer, the term of this patent is extended or adjusted under 35 U.S.C. 154(b) by 503 days.

(21) Appl. No.: 17/734,091

(22) Filed: May 1, 2022

Related U.S. Application Data (60) Provisional application No. 63/185,262, filed on May 6, 2021.

(51) Int. Cl.
*G06V 40/40* (2022.01)
*G06V 20/64* (2022.01)
*G06V 40/16* (2022.01)
*G06V 40/60* (2022.01)

(52) U.S. Cl.
CPC .............. *G06V 40/45* (2022.01); *G06V 20/64* (2022.01); *G06V 40/171* (2022.01); *G06V 40/67* (2022.01)

(58) Field of Classification Search
CPC ...... G06V 40/45; G06V 40/168; G06V 40/40; G06V 40/16; G06V 20/64; G06V 40/165; G06V 40/67; G06V 40/171; G06F 21/32; G06F 21/31
See application file for complete search history.

(56) References Cited

U.S. PATENT DOCUMENTS

| | | |
|---|---|---|
| 6,792,618 B1 | 9/2004 | Bendinelli |
| 7,403,920 B2 | 7/2008 | Nishikiori |
| 8,154,615 B2 | 4/2012 | Fedorovskaya |
| 8,448,056 B2 | 5/2013 | Pulsipher |

(Continued)

FOREIGN PATENT DOCUMENTS

| | | | |
|---|---|---|---|
| CN | 103955668 A | * | 7/2014 |
| CN | 105868716 A | * | 8/2016 |

(Continued)

OTHER PUBLICATIONS

Timoner et al, U.S. Appl. No. 16/409,422, filed May 10, 2019.

(Continued)

*Primary Examiner* — Dung Hong
(74) *Attorney, Agent, or Firm* — Davis, Malm, D'Agostine PC; David J. Powsner (57) ABSTRACT

The invention provides, in some aspects, a method of access control that includes receiving one or more frames ("depth frames") of a depth image stream acquired by a depth camera and, for each of those depth frames, generating one or more scores of the liveness of the image and/or of a candidate individual therein. The method includes creating a point cloud from a respective depth frame and generating the liveness score from a vector based on geometric characteristics of eigenvalues of point-wise neighborhoods within that point cloud. That vector, which characterizes the respective depth frame and surface contours of a face of the candidate individual represented therein, can serve as a measure of how that surface varies and, thereby, permits it to be distinguished from a spoof, e.g., a depth image of faces printed on paper or shown a digital display.

13 Claims, 2 Drawing Sheets

(56) References Cited

U.S. PATENT DOCUMENTS

| | | | |
|---|---|---|---|
| 9,412,180 B2 | 8/2016 | Ono | |
| 9,538,158 B1* | 1/2017 | Rush | A61B 5/1128 |
| 9,672,535 B2 | 6/2017 | Higgins | |
| 9,691,074 B2 | 6/2017 | Fan | |
| 11,010,597 B1 | 5/2021 | Timoner | |
| 11,132,532 B1 | 9/2021 | Livitz | |
| 11,151,390 B1 | 10/2021 | Henon | |
| 11,495,052 B1 | 11/2022 | Timoner | |
| 11,544,965 B1 | 1/2023 | Livitz | |
| 2006/0044446 A1 | 3/2006 | Porter et al. | |
| 2007/0230799 A1 | 10/2007 | Shniberg | |
| 2009/0080715 A1* | 3/2009 | van Beek | A61B 5/0059 |
| | | | 348/E7.087 |
| 2013/0236072 A1 | 4/2013 | Sun | |
| 2013/0159350 A1* | 6/2013 | Sankar | G06F 3/017 |
| | | | 707/E17.005 |
| 2014/0044348 A1 | 2/2014 | Chen | |
| 2014/0337066 A1 | 7/2014 | Kephart | |
| 2016/0063316 A1 | 3/2016 | Lee et al. | |
| 2016/0086015 A1 | 3/2016 | Irmnatov | |
| 2016/0171346 A1 | 6/2016 | Han | |
| 2016/0350334 A1 | 12/2016 | Bataller et al. | |
| 2016/0350587 A1 | 12/2016 | Bataller | |
| 2016/0379050 A1* | 12/2016 | Tian | G06V 40/40 |
| | | | 382/118 |
| 2017/0124385 A1* | 5/2017 | Ganong | G06F 16/50 |
| 2017/0300744 A1 | 10/2017 | Ju | |
| 2018/0027272 A1 | 1/2018 | Raj et al. | |
| 2018/0032796 A1 | 2/2018 | Kuharenko et al. | |
| 2018/0307815 A1* | 10/2018 | Samadani | G06V 40/45 |
| 2019/0005310 A1 | 1/2019 | Kim | |
| 2019/0130167 A1* | 5/2019 | Ng | G06V 40/166 |
| 2019/0130513 A1 | 5/2019 | Norimatsu | |
| 2019/0208181 A1* | 7/2019 | Rowell | H04N 9/8205 |
| 2020/0036528 A1* | 1/2020 | Ortiz | H04W 12/10 |
| 2020/0175260 A1* | 6/2020 | Cheng | G06T 7/50 |
| 2020/0257889 A1* | 8/2020 | Merkel | G06F 16/535 |
| 2021/0049391 A1* | 2/2021 | Zou | G06T 7/62 |
| 2021/0150240 A1* | 5/2021 | Yu | G06V 40/169 |
| 2022/0189110 A1* | 6/2022 | Tang | G06V 40/40 |
| 2022/0327879 A1* | 10/2022 | Hayase | G06V 40/10 |

FOREIGN PATENT DOCUMENTS

| | | | | |
|---|---|---|---|---|
| CN | 106937532 A | * | 7/2017 | G06K 9/00288 |
| CN | 110580454 A | * | 12/2019 | |
| CN | 111126246 A | * | 5/2020 | G06K 9/00248 |
| CN | 111160233 A | * | 5/2020 | G06K 9/00228 |
| KR | 20150031085 A | * | 3/2015 | |
| WO | WO-2020258119 A1 | * | 12/2020 | |

OTHER PUBLICATIONS

Livitz et al, U.S. Appl. No. 16/678,681, filed Nov. 8, 2019.
Livitz et al, U.S. Appl. No. 16/679,021, filed Nov. 8, 2019.
Henon et al, U.S. Appl. No. 16/880,467, filed May 21, 2020.
Timoner et al, U.S. Appl. No. 17/195,803, filed Mar. 9, 2021.
Livitz et al, U.S. Appl. No. 17/241,223, filed Apr. 27, 2021.
Livitz et al, U.S. Appl. No. 17/472,962, filed Sep. 13, 2021.
Henon et al, U.S. Appl. No. 17/734,091, filed May 1, 2022.
Timoner et al, U.S. Appl. No. 17/750,365, filed May 22, 2022.
Livitz et al, U.S. Appl. No. 18/146,420, filed Dec. 26, 2022.
Livitz et al, U.S. Appl. No. 63/016,957, filed Apr. 28, 2020.
Henon et al, U.S. Appl. No. 63/185,262, filed May 6, 2021.
Thomas et al, "Semantic Classification of 3D Point Clouds with Multiscale Spherical Neighborhoods," published at arXiv:1808.00495, submitted Aug. 1, 2018.

* cited by examiner

SYSTEM AND METHOD FOR ACCESS CONTROL USING LIVENESS DETECTION

REFERENCE TO RELATED APPLICATIONS

This application claims the benefit of commonly assigned U.S. Provisional Patent Application Ser. No. 63/185,262, filed May 6, 2021, entitled SYSTEM AND METHOD FOR ACCESS CONTROL USING LIVENESS DETECTION, the teachings of which are incorporated herein by reference.

This application is related to the following commonly assigned United States patent applications, the teachings of all of which are incorporated herein by reference herein:

U.S. Provisional Patent Application Ser. No. 63/016,957, filed Apr. 28, 2020, entitled SYSTEM AND METHOD FOR ACCESS CONTROL USING A PLURALITY OF IMAGES;

U.S. patent application Ser. No. 17/241,223, filed Apr. 27, 2021, entitled SYSTEM AND METHOD FOR ACCESS CONTROL USING A PLURALITY OF IMAGES, which is a continuation in part of commonly assigned U.S. patent application Ser. No. 16/679,021, filed Nov. 8, 2019, entitled SYSTEM AND METHOD FOR FACIAL RECOGNITION ACCURACY, which (i) claims the benefit of filing of U.S. Provisional Patent Application Ser. No. 62/758,268, filed Nov. 9, 2018, entitled SYSTEM AND METHOD FOR FACIAL RECOGNITION ACCURACY, (ii) is a continuation in part of commonly assigned U.S. patent application Ser. No. 16/409,422, filed May 10, 2019, entitled DIGITAL DATA SYSTEMS AND METHODS USING FACIAL RECOGNITION, which itself claims the benefit of filing of U.S. Provisional Patent Application Ser. No. 62/669,698, filed May 10, 2018, and entitled "Use of Facial Recognition to exclude Persons of Interest from High Value Events or High Value Venues."

BACKGROUND OF THE INVENTION

The invention relates to digital data processing, digital image analysis, facial recognition and computer-mediated security systems. The invention has application, by way of non-limiting example, in access control, including permitting or denying persons access to resources, such as gated entrances and locked rooms.

A problem for home- and business-owners alike is determining whom to permit to enter premises and whom to exclude. Security to control access to a premises or other resource can be done in a variety of ways including combination locks, keys, and electronic badges. For the methods mentioned, the combination, key, badge or other token necessary to gain entry can be surreptitiously shared, allowing access to persons who should not have it. Alternative systems for access control rely on biometric markers, e.g., physiological attributes of individual "key holders" that cannot be easily shared, e.g., fingerprints, voice prints, and so forth.

Facial recognition, the computer-based, automated process of identifying people from their images, has become an increasingly popular mechanism for access control. This is, in part, because of the intuitive nature of the identification being performed and, in part, because it lends itself to being double-checked, whether by security guards present at the access point or by viewing video footage afterwards.

Unfortunately, computer-based facial recognition can be spoofed. A common way is for an intruder to block the video camera at the access point with a still picture of an authorized individual or, perhaps, with a tablet computer or smart phone displaying a digital close-up of that individual. Computerized systems will typically grant access to the intruder in this circumstance, since the video stream shows only the authorized individual and is accepted as such by the facial recognition software. Advanced facial recognition systems use "liveness" detection to thwart such hacks. For this, they employ infrared or depth cameras, in addition to traditional video (or "visible") cameras. Whereas the images generated by the latter capture the light intensity and color at each point in the field of view, those generated by infrared and depth cameras capture the distance of each of those points from the camera.

Even with this, reliably detecting spoofs by computer can be challenging for a number of reasons, including, but not limited to, noise, poor camera quality and positioning, bad lighting, and other factors that adversely impact the performance of video and infrared/depth cameras, alike. The latter are particularly prone to poor performance on account of technical shortcomings inherent to the infrared/depth cameras used in most affordable security systems. And, while spending more money on cameras (e.g., to improve their quality and increase their number), lighting and computer resources can overcome these challenges, the drawback is increased cost.

An object of the invention is to provide improved systems, apparatus, and methods for digital data processing, digital image analysis, facial recognition, liveness detection and computer mediated security for access control and other applications.

A further object is to provide such systems, apparatus, and methods as are suitable for use in homes, businesses, public and private events and other applications.

Yet still further objects of the invention are to provide such systems, apparatus and methods as can be implemented at low cost.

SUMMARY OF THE INVENTION

The foregoing are among the objects obtained by the invention which provides, in some aspects, a method of access control that includes receiving one or more frames ("depth frames") of a depth image stream acquired by a depth camera and, for each of those depth frames, generating one or more scores of liveness of the frame and/or of the candidate individual depicted therein. The method includes creating a point cloud from a respective depth frame and generating the liveness score from a vector that is based on geometric characteristics of point-wise neighborhoods, e.g., within that point cloud or a binning thereof. That vector, which characterizes the respective depth frame and surface contours of a face of the candidate individual represented therein, can serve as a measure of how that surface varies and, thereby, permits it to be distinguished from a spoof, e.g., a depth image of faces printed on paper or shown a digital display.

Related aspects of the invention provide methods of access control, e.g., as described above, wherein the liveness score is generated from a vector that is based on geometric characteristics of eigenvalues of such point-wise neighborhoods, e.g., within that point cloud or a binning thereof.

Related aspects of the invention provide methods of access control, e.g., as described above, wherein the step of generating the liveness score from the vector includes applying the vector to a machine learning algorithm. That algorithm can be, according to related aspects of the invention, a boosting algorithm, a support vector machine, a perceptron or otherwise.

Further related aspects of the invention provide methods of access control, e.g., as described above, comprising the step of training the machine learning algorithm with vectors of the type described above generated from a set of training depth images.

Those training depth images can include, according to related aspects of the invention, both instances of legitimate persons presenting themselves before a depth camera and spoofs of such instances—where those spoofs can include, for example, faces printed on paper or shown a digital display.

Still other related aspects of the invention provide methods, e.g., as described above, wherein the geometric characteristics include any of sphericity, linearity, planarity and local surface variation. In further related aspects, the invention provides such methods in which the geometric characteristics include all of the foregoing.

Yet still further aspects of the invention provide methods, e.g., as described above, including the step of performing range-checking to determine if the candidate individual is within the working range of the depth camera. In related aspects of the invention, the range-checking step is performed on the point cloud. In another related aspect of the invention, the range-checking is performed on one or more video images of a video image stream that corresponds to the depth image stream. Such checking can be performed, for example, by gauging interocular distances in faces in those video images.

Further aspects of the invention provide methods, e.g., as described above, that further include binning the point cloud to reduce resources necessary to generate the liveness score from the vector that is based on geometric characteristics of point-wise neighborhoods and/or of eigenvalues of such neighborhoods.

Yet still further aspects of the invention provide methods, e.g., as described above, that includes the step of generating eigenvalues of neighborhoods of points in the point cloud or in the binned point cloud. This can be the neighborhood of points surrounding every point in the point cloud or those surrounding selected points in the cloud.

Related aspects of the invention provide methods, e.g., as described above, that includes the step of generating a histogram of the geometric characteristics of those neighborhoods and/or of eigenvalues thereof. The vector can be generated, according to related aspects of the invention, by concatenating counts in each of the bins of the histograms with one another.

Other aspects of the invention provide methods of access control, e.g., as described above, in which the step of generating the liveness score includes generating that score to represent not only liveness of the face shown in the respective depth frame but, also, whether the face matches that of a known individual. In related aspects, the invention provides methods, e.g., as described above, including training the machine learning algorithm with vectors of the type described above generated from depth images of each known individual.

Still other aspects of the invention provide methods, e.g., as described above, comprising generating liveness scores for each of multiple depth frames and computing an average or other statistical measure of multiple scores.

Yet still other aspects of the invention provide methods, e.g., as described above that include performing facial recognition on one or more frames of a video stream that corresponds to the depth stream and that includes one or more images of the candidate individual. Related aspects of the invention provide such a method in which facial recognition is performed prior to generation of the liveness score.

Further related aspects of the invention provide methods, e.g., as described above, including actuating an electro-mechanical, magneto-mechanical, optical-mechanical or other security mechanism, thereby, permitting (or preventing) the candidate individual access to a secured room, facility or other resource.

Other aspects of the invention provide a method, e.g., as described above, that includes messaging the candidate individual if a score of a frame is in a designated range. In related aspects of the invention, the message is a directive that is based on that score. Thus, for example, according to further related aspects of the invention, the method includes messaging the candidate individual to modify his/her position.

These and other aspects of the invention are evident in the description, drawings and claims hereof.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Architecture

Figure 1:
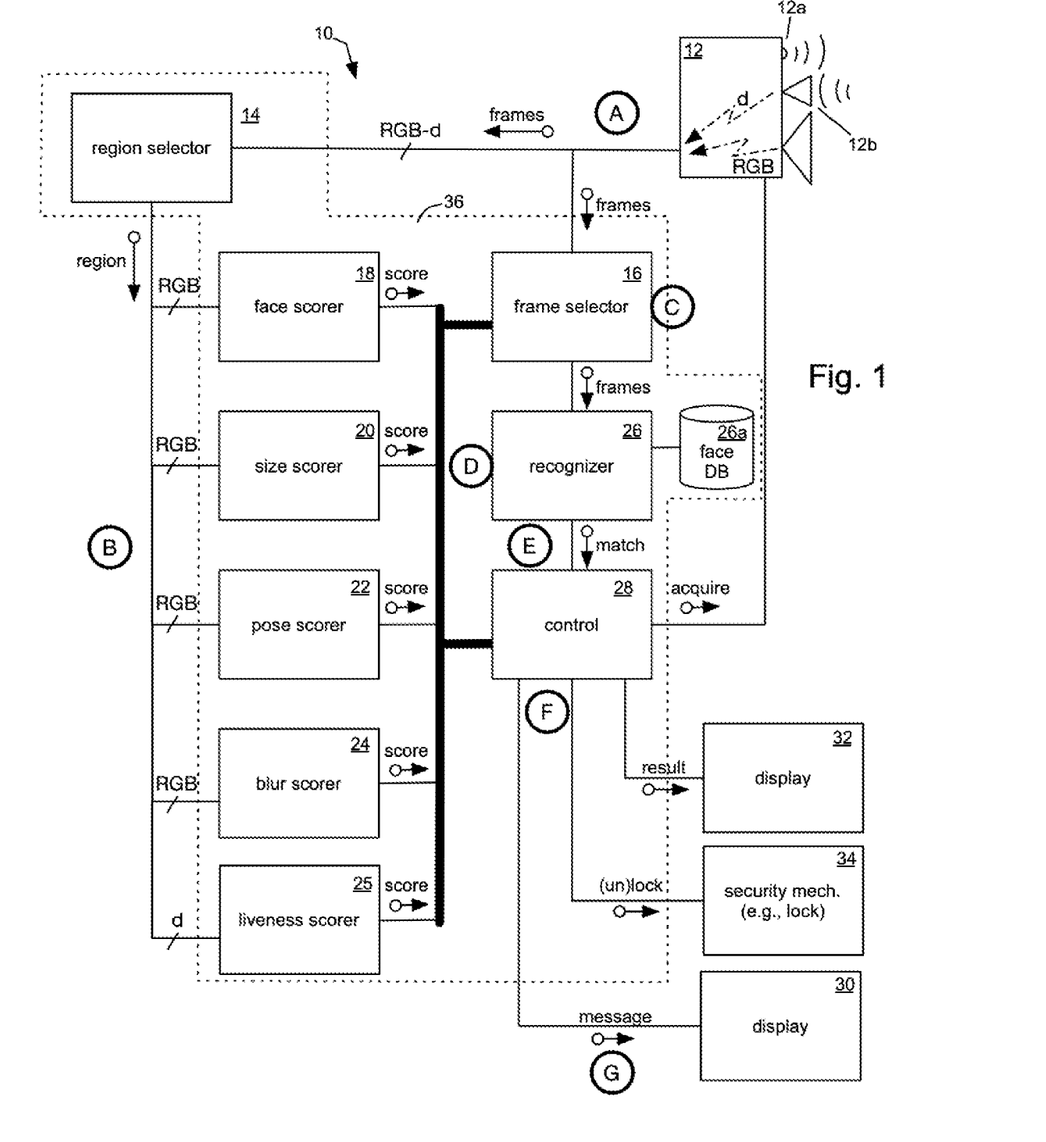
FIG. 1 depicts a system and method for access control according to the invention.

FIG. 1 depicts a system, apparatus and method according to one practice of the invention for access control using liveness scoring, e.g., in connection with face recognition. The system 10 includes an RGBD camera 12 that is coupled to a frame selector 16 which, in turn, is coupled to a face scorer 18, a size scorer 20, a pose scorer 22, a blur scorer 24 and a liveness scorer 25. The scorers are coupled to a frame selector 26 and to a control 28 that is, in turn, coupled to a security mechanism 34 and one or more displays, here, displays 30, 32. The frame selector 16 is also coupled to a face recognizer 26, which too is coupled to control 28. An optional region selector 14 is interposed between the camera 12 and the scorers 18-25, as shown.

In the illustrated embodiment, elements 14-28 are implemented in software that executes on a digital data processor 36, which can be a workstation, desktop, laptop, micro, embedded or other general- or special-purpose computing device of the type that is (i) commercially available in the marketplace or otherwise known in the art, as adapted in accord with the teachings hereof, and (ii) that may incorporate one or more graphics processing units (GPU) or other hardware and/or software suited to image processing and/or deep neural networks, including by way of non-limiting example, the TPU (Google Inc, Mountain View, CA) or CoreML (Apple Inc., Cupertino CA) or the Movidius chip (Intel Inc. Santa Clara, CA), again, all as adapted in accord with the teachings hereof.

Other embodiments may vary in one or more of these regards. Thus, for example, elements 14-28 may execute in distributed fashion across multiple devices be they general-purpose computers, special-purpose logic, or otherwise, as is within the ken of those skilled in the art in view of the teachings hereof.

Coupling between such multiple devices, in embodiments that utilize them, can be via local area network (LAN), Internet, and/or other communications media (wireless or wired) of the type commercially available in the marketplace or otherwise known in the art, as adapted in accord with the teachings hereof. This is likewise true of coupling between the RGBD camera 12 and digital data processor 36, as well as between it and displays 30, 32 and security mechanism 34.

Device 12 is an RGBD camera or other image acquisition device (hereinafter, "RGBD camera" or, simply, "camera") that generates (i) a stream of video images (hereinafter, "video stream" or "video frames" in the text, and "RGB" in the drawing) of a field of view, e.g., showing a person—hereinafter referred to as the "candidate" individual—nearing and/or near a resource or access point (such as a door or turnstile, gated entrance, locked room, or so forth), and (ii) a corresponding stream of depth images ("depth stream," "depth frames" or "depth image stream" in the text, and "d" in the drawing) of that field of view. See reference numeral (A) in the figure, hereinafter (like its brethren) "Step (A)."

In the illustrated embodiment, camera 12 is a conventional depth camera of the type commercially available in the marketplace (e.g., in the guise of so-called Kinect-style cameras) or otherwise known in the art, as adapted in accord with the teachings hereof, though, in other embodiments other image acquisition devices suitable for acquiring video and/or depth frames of a scene may be used instead (e.g., stereo cameras with associated distance-determining functionality). And, although, the video images and depth images generated by camera 12 of the illustrated embodiment are generated by a single device, in practice multiple devices may be used instead or in addition.

Per convention, the video images comprise pixels defining the light intensity and color at each point in the field of view, though, in some embodiments gray scale or other "color" spectra are employed; regardless, for sake of simplicity, the notation RGB is used herein throughout. The depth images, on the other hand, capture the distance of each of those points from the camera, i.e., "distance pixels" in the discussion that follows. It may, depending upon capabilities of the camera utilized, capture the infrared (or heat) intensity of each of those points. In the illustrated embodiment, the camera 12 incorporates an infrared transmitter 12a to facilitate distance determination per convention in the art; though, alternatives for facilitating such determination (sound, laser, and so forth) within the ken of those skilled in the art may be used instead or in addition.

The corresponding frames of the video and depth streams may be synchronized in time with one another and their fields of view aligned in space, that is not a requirement of the invention so long as there is sufficient concurrence in time and alignment in space to permit mapping features (e.g., a face) shown on one with that in the other, all as is within the ken of those skilled in the art in view of the teachings hereof.

Although in the illustrated embodiment, the RGBD camera 12 captures both video images and depth images, in some embodiments camera 12 generates only depth images. In such embodiments, processing of video images is handled, if at all, by separate apparatus (not shown) per the methodologies discussed below for the processing of such images. Alternatively put, some embodiments provide for the capture and processing of depth images only in accord with the methodologies discussed herein.

In embodiments in which the candidate individual is expected to walk toward the access point, the camera 12 is preferably selected, disposed and/or aimed to (i) maximize depth resolution when the candidate is poised for recognition and/or to enter, use or otherwise access the access point, and (ii) minimize the effect of blur on acquisition of images of the individual. To this end and consistent with the discussion above, although, only one device 12 is shown in the drawing, it is within the ken of those skilled in the art to use multiple such devices (e.g., at different vantage points) in view of the teachings hereof—e.g., thereby providing for the generation of video frames from one vantage point (e.g., with more fulsome images of the candidate individual's face, regardless of pose, obstructions or otherwise) and providing for the generation of depth frames from another vantage point. Moreover, although shown independently, here, in some embodiments, camera 12 may be co-housed with displays 30, 32, control 28 and/or digital data processor 36, all as is within the ken of those skilled in the art in view of the teachings hereof.

Frame Selection

Scorers 18-24 of the illustrated embodiment generate scores for each of the frames in the video stream received from the RGBD camera 12, and liveness scorer 25 generates a score from the depth stream. See Step (B). In the illustrated embodiment scorers 18-25 operate in parallel with one another and, indeed, can operate synchronously, e.g., so that the scores generated by them are concurrently available to frame selector 16 for purposes of composite score generation, as discussed below. In some embodiments, liveness scorer 25 is not invoked in Step (B), but rather is invoked in Step (F), once controller 28 has determined there is a match between a face in a video image, but before granting access via security mechanism 34. As those skilled in the art will appreciate, invoking the scorer 25 in Step F rather than step B has the potential advantage of reducing compute required.

The scores generated by the scorers 18-25 are indicative of characteristics of respective frames of the respective streams and/or, more particularly, of the video image or depth image, as the case may be, of the candidate individual himself/herself depicted in those images. And, although, the embodiment illustrated here and described below includes a face, size, pose, blur, and liveness scorers, it will be appreciated that other embodiments may vary in this regard, e.g., incorporating only a liveness scorer 25, and zero, one or more of the other scorers, all as is within the ken of those skilled in the art in view of the teachings hereof. For example, some embodiments utilize, in addition to the liveness scorer 25, only pose and size detectors, since they can in some instances be sufficient for adequate frame selection, and eschew blur detection, again, all by way of example. Moreover, in embodiment that utilize the liveness scorer 25 for face recognition, the recognizer 26 discussed below may not be required.

To speed and focus operation of the scorers 18-25, region selector 14 is employed in the video stream pathway from camera 12, as shown. In this optional step, the selector 14 crops the incoming frames, limiting the portions on which the scorers 18-25 operate to an area of interest (e.g., near the access point) in the camera 12 field of view, which can be determined empirically or otherwise, e.g., during system setup. This has the benefit of eliminating from the frames faces or other elements that may slow operation of the scorers 18-25, in addition to facilitating identifying images of the candidate individual.

Face Scorer

To this end, face scorer 18 of the illustrated embodiment comprises a conventional face detector of the type commercially available in the marketplace and/or otherwise known in the art, as adapted in accord with the teachings hereof. The scorer 18 of the illustrated embodiment—which may be, for example, an MTCNN face detector—generates a score indicative of a number of individuals in the frame or a region thereof (hereinafter, for simplicity, a "frame"). In other embodiments, the score may be a value indicating whether one (and only one) individual is imaged in the frame, or otherwise.

Size Scorer

Illustrated size scorer 20 can, likewise, comprise a conventional face detector of the type commercially available in the marketplace and/or otherwise known in the art, as adapted in accord with the teachings hereof. The scorer 20 of the illustrated embodiment (which, too, may be an MTCNN face detector, or otherwise) generates a score indicative of a measure or other characteristic of a face (presumably, for example, that of the candidate individual) in the frame. This is preferably, for example, an interocular distance, though it can be a face width and height, or otherwise. And, though that score can reflect such dimension (or dimensions) in pixels or otherwise, in some embodiments, it is a closeness of that/those dimension(s) to the maximal effectiveness range of the recognizer 26. Such a range can be determined empirically, e.g., through testing of sample images, or otherwise, as is within the ken of those skilled in the art in view of the teachings hereof.

If multiple faces are imaged in the frame (e.g., the candidate individual and others), element 20 can generate as the score an array, linked list or other collection reflecting the dimension(s) of each respective face in the image (along with an ID of that face, e.g., returned by the face detector that makes up the scorer 20 or otherwise) for use by the frame selector 16 and/or recognizer 26 in discriminating among face(s) in the image to be analyzed and those to be ignored (e.g., as representing persons distant from the camera 12).

Pose Scorer

Pose scorer 22 can, likewise, comprise a conventional face detector of the type commercially available in the marketplace and/or otherwise known in the art, as adapted in accord with the teachings hereof. It generates a score indicative of the pose of the head of the individual (presumably, for example, that of the candidate individual) in the frame. In the illustrated embodiment, that score can comprise the angle of the head in each of three dimensions, e.g., as determined from the relative positions of facial landmarks returned by the face detector that makes up the scorer 22 or otherwise. In other embodiments, the score is based on yaw and pitch for people looking down or looking to the side and ranges from 0.7 to 1.0, rather than 0.0 to 1.0

Alternatively, or in addition, the scorer 22 can comprise an enumeration (e.g., "acceptable," "poor," or otherwise, by way of non-limiting example) based on ranges of such angles that are suitable for face recognition by recognizer 26, or otherwise. In this latter regard, it will be appreciated that facial recognition algorithms are typically more effective with a person looking straight at the camera and, often, drop off steeply in effectiveness with faces in full profile, rather than fully frontal.

If multiple faces are imaged in the frame, element 22 can generate as the score an array, linked list or other collection reflecting the pose of each respective face in the image (along with an ID of that face, e.g., returned by the face detector that makes up the scorer 22 or otherwise) for use by the frame selector 16 and/or recognizer 26 in discriminating among face(s) in the image to be analyzed and/or those to be ignored.

Blur Scorer

Illustrated blur scorer 24 comprises conventional such functionality of such type known in the art suitable for generating a measure or other characterization of blur in an image. Scorer 24 of the illustrate embodiment generates that measure as the sum squares of a Laplacian digital filter computed across the face (presumably of the candidate individual) shown in the image and/or across the image itself. Other embodiments may use other measures of blur, instead or in addition. For example, in some embodiments the blur score ranges from zero to one. Regardless, the score generated by element 24 may be the absolute measure generated as a result of the aforesaid techniques or an enumeration based thereon (e.g., "acceptable", "poor", or otherwise, by way of non-limiting example) based on the degree of image clarity required for operation of recognizer 26.

Liveness Scorer

Illustrated liveness scorer 25 determines if a face imaged by camera 12 is that of a person who is present before the camera and is not a spoof, e.g., a still picture or a video image replayed on a tablet computer or smart phone. Scorer 25 makes that determination and generates a corresponding liveness score by executing the methodology shown in FIG. 2 and described below. The methodology can be practiced on every depth image generated by camera 12, e.g., in connection with Step (B), above; though, in some embodiments, it is practiced in connection with Step (F), e.g., once a face in a video stream captured by camera 12 has been recognized as a match against database 26a or other store of images. Regardless, in the discussion that follows, a depth frame currently being processed is referred to as the "current" frame. And, although in the illustrated embodiment, the methodology below is practiced on a single depth image at a time, the current frame can be a composite of multiple such images (e.g., suitably registered for facial alignment), the fabrication of which composite is within the ken of those skilled in the art.

Identifying Depth Images of Faces

Figure 2:
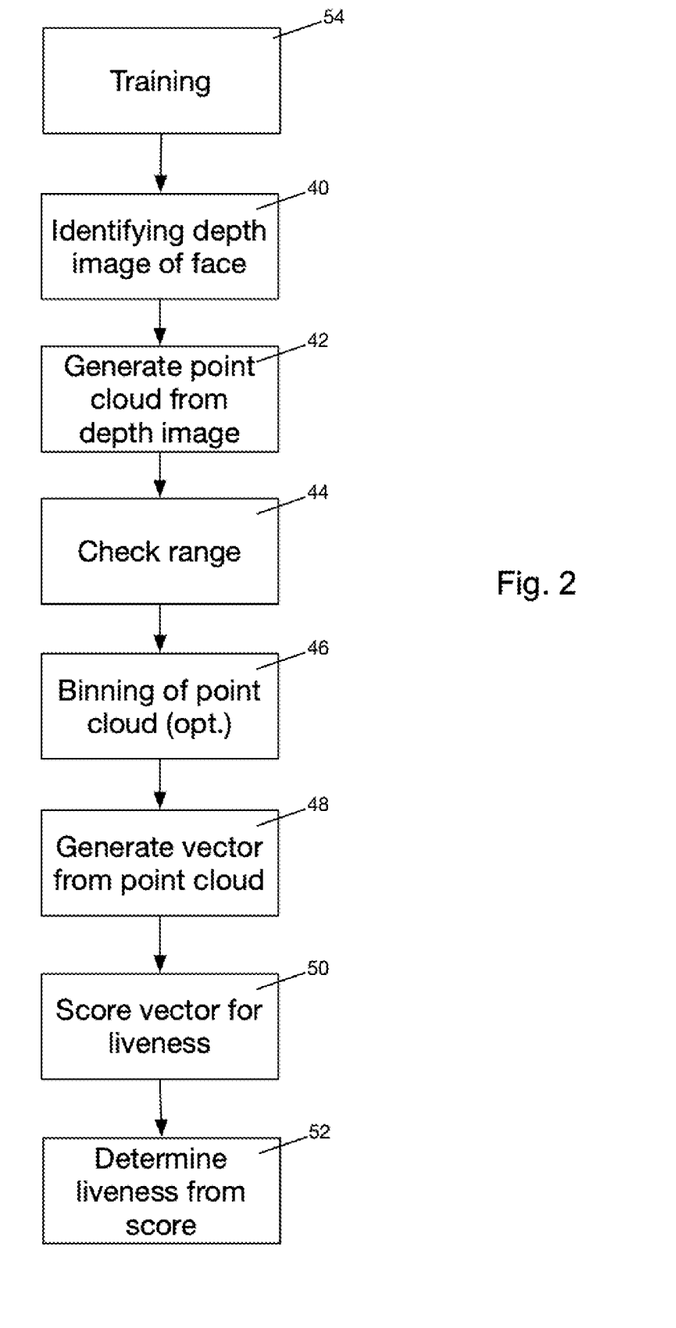
FIG. 2 depicts a method of liveness scoring in a system according to the invention.

In step 40, the scorer 25 identifies, within the current depth frame, respective regions (or "crops") that include each face of actual or potential interest, along with a margin typically of 0%-25%, depending on the embodiment, that includes some background, e.g., in juxtaposition with edges of the face. This can be accomplished, for example, (i) applying a face detector (e.g., of the type commercially available in the marketplace and/or otherwise known in the art, as adapted in accord with the teachings hereof) to the "depth" pixels in the depth frame to locate each such face (or head), (ii) mapping to the depth frame a face recognized by the controller in the corresponding video frame (e.g., in Step (F)), or (iii) effecting either (i) or (ii) in connection with a tracker, e.g., based on Kalman filters and predicted rectangle overlaps, or otherwise of the type commercially available in the marketplace and/or known in the art (as adapted in accord with the teachings hereof), to track a face of actual or potential interest across multiple frames, e.g., until a robust depth image of it appears among the frames and the respective region or crop within which it lies is identified.

Operation of the scorer 25 in this latter regard is advantageous in that it obviates a requirement that the depth images be acquired under ideal conditions (e.g., so that faces within them are represented at high signal-to-noise ratios) and/or that the camera 12 be of particularly high quality. Rather, since the depth images of most practical applications are likely to be noisy, embodiments operating in this regard can take advantage of many depth frames to improve scoring of a single such frame. Moreover, it is not necessary for the face detector to analyze the current depth frame in entirety to distinguish from background.

Other techniques for identifying respective regions or crops of faces ("depth images of faces") within the current depth frame are within the ken of those skilled in the art in view of the teachings hereof. The discussion that follows addresses scoring the liveness of the face within one of those regions or crops, hereinafter sometimes referred to as the "depth image of a face" a "face depth image," or the like. References to scoring the liveness of the current frame will likewise be understood to mean scoring the depth image of a face, unless otherwise evident in context.

Converting a Depth Image of Face to Point Cloud

In step 42, the scorer 25 generates a point cloud from the face depth image—that is, a dataset of 3-vectors, i.e., x, y, and z values, representing locations of points on the surface of the face relative, e.g., to the camera 12. In some embodiments, the dataset comprises 4-vectors which, in addition to representing the x, y, and z coordinates of the surface points, represent their infrared (or heat) intensity. That additional data can facilitate identifying spoofs involving statues or other 3-D models, as well as those where one person tries to substitute from another by wearing a mask.

Generation of a point-cloud from the face depth image can be accomplished in any conventional manner known in the art as adapted in accord with the teachings hereof. Thus, for example, horizontal (x) and vertical (y) coordinates of each point in the point cloud can be computed from pixel coordinates in the face depth image using the intrinsic parameters of the camera 12, such as, for example, the focal length. One simple way to do the conversion is using the pinhole model of a camera. For example, the horizontal distance becomes the distance from the center of the camera 12 in pixels, divided by the focal length multiplied by the depth. Other techniques of determining the x- and y-coordinates corresponding to pixels in the face depth image are within the ken of those skilled in the art in view of the teachings hereof. The z-coordinates for those respective pixels are provided in the depth image itself, e.g., as values of those pixels. They can be stored directly to the point cloud along with the x- and y-coordinates of the corresponding pixels, as can infrared (or heat) intensity values for those pixels, if so provided in the depth stream.

Range Checking

In step 44, the scorer 25 determines the depth range of the point cloud—that is, whether a sufficient number of the points in it are within the working range of the camera 12. In this regard, those skilled in the art will appreciate that the depth sensor 12b of the camera 12 typically has an operational range within which it can capture viable depth measurements: it won't work well if a face being imaged by the camera 12 is too close or too far from the camera. Different depth sensors fail in different ways. For example, sensors 12b in the nature of Apple's TrueDepth camera return noise-like depth data, missing data, or data of near constant depth, for imaged points that are too far from the camera. It returns no depth data at all for points that are too close. And, in the case of sunlight, it often has missing data.

In step 44, the range checker iterates through the point cloud to generate a statistical or other measure of the depth ranges of points in it. This can be, by way of non-limiting example, a mean, a mean and standard deviation, or other such measure of depths in the point cloud. In some embodiments, that measure contributes to the overall score of liveness generated by the scorer 25. It can, instead or in addition, govern whether liveness processing of the depth frame currently being processed will continue at all; for example, the scorer 25 can cease processing on point clouds with little or no viable depth data.

Implementation of range checking, in step 44, can be done in a variety of ways. For example, depending on the properties of the sensor 12b, the scorer 25 can count the number of points in the depth cloud for which there is no data—e.g., indicating that the face being imaged was too close. Conversely, or in addition, it can check if the face was too far by taking an average of depth values within the current depth frame sans margins around the crop that represent background. Utilization of such counts and/or averages in generating a statistical or other measure of liveness is within the ken of those skilled in the art in view of the teachings hereof.

In another method, the scorer 25 uses information from the video frame corresponding to the current depth frame to gauge the interocular distance (that is, eye-to-eye distance) of the face and compares that distance with expectations in view of the distances represented in the point cloud. For a spoof, the interocular distance may cause an incorrect computation of the distance. For example, a picture of a face on a mobile phone screen held closely to the camera 12 may appear to the RGB camera to be the correct size, but is actually much smaller than the face itself. In such a case, the interocular distances in the video frame would be small in comparison to what would be expected of an actual face that close to the camera 12. Utilization of such distances in generating a statistical or other measure of liveness is within the ken of those skilled in the art in view of the teachings hereof.

As those skilled in the art will appreciate, the depth sensor 12b and image sensor 12c of camera 12 typically are of different operational ranges: often face recognition from the video stream generated by sensor 12c can be done further back from the camera 12; whereas liveness detection from the depth stream generated by sensor 12b is typically done closer. For this reason, the illustrated embodiment does not utilize the liveness score generated by element 25 as a gating function for face recognition; though, other embodiments may vary in this regard.

Binning the Point Cloud

In step 46, the scorer 25 bins the point cloud. This step, which is optional, has the benefit of reducing the number of points processed in subsequent steps of the method of scorer 25 and, therefore, can reduce processor and other resource consumption required by them—as well as the time required to execute those steps. The degree of binning and determination of whether it is done at all is within the ken of those skilled in the art, typically, as a function of the requirements and capabilities of any given implementation.

Binning of the point cloud can be done in any manner known in the art, e.g., by forming a 3D voxel grid with a predefined voxel size, assigning each point in the point cloud to a respective voxel based on proximity, and averaging the depth (and, if present, the intensity) values of all points assigned to a given voxel. Other techniques for binning may be used instead and/or in addition.

The resulting voxel grid can be substituted for the point cloud in the discussion of subsequent processing steps that follows.

Processing the Point Cloud

In steps 48-50, the scorer 25 processes the point cloud to determine the liveness of the face shown in the current depth frame and, in step 52, determines whether or not that face is a spoof.

In some embodiments, the methodology below is applied not to the entirety of the current depth frame but, rather, to one or more (potentially overlapping) regions of that frame, e.g., representing regions around the eyes, regions around the lips, quadrants of the face or otherwise, all as is within the ken of those skilled in the art in view of the teachings hereof. An advantage of this approach is that it permits the methodology to be applied to regions of the face which tend to more aptly characterize liveness (e.g., depth variations in the region of the eyes and lips, for example). In order to achieve adequate alignment for such an approach, embodiments can use a similarity transform (a scale and a translation) using the visible image, and the landmark of the centers of the eyes, corners of the mouth and the nose. Moreover, during training of the boosting or other machine learning algorithm (as discussed below), small variations of pose can be added to prevent alignment errors from skewing the score generated in step 50 and leading to false rejections in step 52.

In step 48, the scorer 25 converts the point cloud into a vector that is based on geometric characteristics of neighborhoods of points in the point cloud—and, in some embodiments (e.g., as illustrated and discussed elsewhere herein), of geometric characteristics of eigenvalues of neighborhoods of points in the point cloud. The geometric characteristics utilized in the illustrated embodiment are sphericity, linearity, planarity, and local surface variation; though, other embodiments may use a greater or lesser number of such geometric characteristics and may use other geometric characteristics of the eigenvalues instead or in addition.

Each neighborhood includes a point in the point cloud and the N points nearest (in distance) thereto in that cloud. In the illustrated embodiment the neighborhood of points surrounding each point in the cloud can be used for this purpose, though, other embodiments may vary in this regard (e.g., using every other point, every third point, and so on, and/or basing the determination of on the value of N, discussed below). Nearness can be computed in the conventional Euclidean sense (e.g., as the square root of the sum of the squares of differences in the respective x-, y- and z-coordinates), or otherwise, as is within the ken of those skilled in the art in view of the teachings hereof. N, which can range from 8-32, or more (or less), is dependent on implementation and/or on the number of points within the point cloud being processed in step 48 and on the speed-wise and resource-wise requirements and capabilities of any given implementation. Thus, for example, in one embodiment, N is selected so that neighborhoods include points within one (1) millimeter of one another.

From each neighborhood, scorer 25 of the illustrated embodiment generates an N×3 array, where N is defined as above and "3" refers to the x-, y- and z-coordinates of the respective points in the neighborhood. The scorer then determines the eigenvalues of the covariance matrix of the N×3 array and sorts those eigenvalues largest to smaller. In the discussion herein, those eigenvalues are represented by $\lambda 1$, $\lambda 2$, $\lambda 3$ where $\lambda 1 > \lambda 2 > \lambda 3$. The scorer 25 of the illustrated embodiment computes from those eigenvalues the following four geometric characteristics (though, as noted above, other embodiments may compute and/or utilize a greater or lesser number of geometric characteristics, instead or in addition, all as is within the ken of those skilled in the art in view of the teachings hereof:

Sphericity=$\lambda 3 / \lambda 1$

Linearity=$(\lambda 1 - \lambda 2)/\lambda 1$

Planarity=$(\lambda 2 - \lambda 3)/\lambda 1$

Local surface variation=$\lambda 3/(\lambda 1 + \lambda 2 + \lambda 3)$

The scorer 25 generates a histogram from the geometric characteristics computed from the of the neighborhoods. Thus, for example, a histogram is generated from all of the sphericity values, a histogram is generated from all of the linearity values, and so forth. Binning for the histogram can be set at sixteen (16) or such other value as might be selected by those skilled in the art in view of the teachings hereof, with each bin representing a respective range of values for the respective geometric characteristic, the bins being of equal delta (i.e., difference between high and low values defining the respective range), and representing a number of neighborhoods whose respective geometric characteristic falls within that respective range; though, in other embodiments, such a histogram might be constructed differently (e.g., with unequal deltas or otherwise), all as is within the ken of those skilled in the art in view of the teachings hereof.

The scorer then generates a vector by concatenating histograms and, more precisely, by concatenating the counts in each of the bins of one histogram (e.g., for sphericity), with the counts in each of the bins of another histogram (e.g., for linearity), and so forth. In an embodiment of the type illustrated here, in which four geometric characteristics are computed for each neighborhood and in which the histograms have 16 bins each, the resulting vector has 64 elements (16×4), though, other embodiments may vary in this regard. As those skilled in the art will appreciate, that vector is based on geometric characteristics of eigenvalues of point-wise neighborhoods within the point cloud (as discussed above) and, thereby, characterizes accordingly the current depth frame and surface contours of the face represented therein. The vector essentially becomes a measure of how that surface varies and, thereby, permits it to be distinguished from depth images of faces shown on paper or a digital display.

The aforesaid vector can include additional elements, as well. For example, in embodiments in which the point cloud contains intensity values for each point (in addition to depth values), the scorer 25 in step 48 appends to each vector generated as described above counts from bins of a histogram generated by binning those intensity values (or, alternatively, for example, intensity variation values). This has the advantage of making the vector not only characterize surface contours of the face represented in the current depth frame but, also, warm and cool regions of that image—thereby allowing the system 10 to distinguish persons wearing masks or 3d-printed heads.

And, by way of further example, in the illustrated embodiment, a vector generated based on geometric characteristics of eigenvalues of neighborhoods within the point cloud as described above can have prepended or appended to it a value representing a number of points in the original point cloud (e.g., as determined in step 42) and a value represent a number of points following binning step 46. Other embodiments may vary in these regards. These may also include measurements of local point density, residuals of fits of surfaces to local neighborhoods, and coefficients or parameters of fits to local neighborhoods.

In other embodiments, the point cloud can be processed by means of a neural network. For example, if the point cloud is N×3 array, each entry N can be processed by a multilayer perceptron (MLP), consisting of L layers, resulting in an N×M array, where M is the number of outputs in the perceptron which can be determined through experimentation as is within the ken of those skilled in the art. The input to the perceptron is the N×3 array of points in the 3 dimensional euclidean coordinates. A normalization scheme may be employed on the array, such as normalizing the array to have zero mean and unit standard deviation. Because the points are unordered, a symmetric function, one that does not depend on order, is used to reduce this N×M array to a 1×M array. Symmetric functions included the sum function and the maximum function. This method converts the variable size unordered set of points to a fixed length array of size M. The array of size M can then be processed most easily by means of another multiplayer perceptron, Other learning methods (e.g. support vector machine, etc.) within the ken of those skilled in the art can be used to predict the probability of spoof. Both the eigenvalue-based method and the multilayer perceptron based on individual points in the point cloud have the advantage that they handle missing data in the depth sensor straightforwardly. In each of these cases, if data is not available, it simply is not processed. Compared to the approach described using a machine learning classifier (such as SVMs, Boosting, decision trees) trained on the hand-crafted features, this neural network approach requires vastly more training data.

In step 50, the scorer 25 generates a liveness score by applying a vector generated in step 48 to a boosting algorithm (or other machine learning algorithm within the ken of those skilled in the art in view of the teachings hereof, e.g., a support vector machine, a perceptron or otherwise, alone or in combination with a boosting algorithm) trained as described below. In some embodiments, that score is the final output of the scorer 25 and is utilized by the controller 28, e.g., in combination with output of the recognizer 26 (as described below) to determine whether a matched face is of sufficient liveness to be accepted as an image of a face of a recognized person—as opposed to a spoof of such person.

In other embodiments, the data acquired from the depth sensor can be processed as a two-dimensional array, of size W×H by means of a convolutional neural network, with each entry in the W×H array measuring depth, or a W×H×2 array measuring depth and intensity, thus not performing steps 42, 44 and 46. This approach then is essentially like the use of a convolutional neural network to process RGB frames from a camera.

In this representation, missing data from the depth sensor, which can be caused by multiple reasons including excessive sunlight, must be represented by a special value such as 0 or −1. This method has the drawback that the features computed by the convolutional neural network would then be affected by this special value. In contrast, in the point cloud representation, missing values from the depth sensor are discarded and do not appear in the point cloud.

Convolutional neural networks are neither depth-nor translation-invariant. By contrast, adequately designed features on point clouds can encode both translation and rotation invariance.

Compared to machine learning classifiers (such as SVMs, Boosting, decision trees) trained on hand-crafted features, neural networks require vastly more training data). Compared to the approach described using a machine learning classifier trained on the hand-crafted features, or a multilayer perceptron based on local neighborhoods, this neural network approach requires vastly more training data).

In other embodiments, the scorer outputs an "accept" or "reject" signal. See step 52. This depends on whether the score generated by the boosting algorithm (or other machine learning tool) is above a threshold that may be determined empirically or otherwise. In the illustrated embodiment, that threshold is to optimize a utility function, e.g., by allowing a small number of spoofs in exchange for not rejecting actual people.

Since depth sensors 12b tend to be noisy, using more depth frames decreases the likelihood of error in our liveness scoring and spoof detection. To that end, the scorer 25 of some embodiments performs steps 40-52 on at least several, e.g., five (5), depth frames, before generating an accept/reject signal—or, in embodiments where the scorer 25 output is generated in step 50 (not 52), that output is an average (computed with or without outlier values) and, preferably, a weighted average, of the scores generated in step 50 for those several depth frames.

Those skilled in the art will appreciate that other statistical measures of the multiple scores can be used instead or in addition. The weighting can be based on a quality of the respective score, e.g., the number of points in the original point cloud from which the score was generated, the depth of range of that point cloud, a learned weighting which uses machine learning to estimate the weights, and/or other factors within the ken of those skilled in the art in view of the teachings hereof. Although the collection and treatment of liveness scores from multiple depth frames is attributed above to the scorer 25, in some embodiments, decisions regarding whether to accept or reject the liveness of a depth stream and/or to compute averages or other measures of multiple liveness scores generated from such a stream falls within the province of the controller 28, discussed below.

The aforesaid boosting (or other machine vision learning) algorithm can be trained, e.g., in step 54 that precedes, in time, run-time operation of steps 40-52, in the conventional manner known in the art as adapted in accord with the teachings hereof. Thus, for example, training vectors generated as described in connection with step 48 from training depth (and video) frames obtained under known circumstances—that include both instances of legitimate persons presenting themselves before the camera 12 and spoofs of same and that include a multitude of acquisition conditions, including motion, variations in depth, lighting, etc.—can be applied in supervised fashion to the algorithm-in-training, with one fraction of those vectors used for training and the other for testing, all as per convention in the art as adapted in accord with the teachings hereof.

In embodiments that employ only a liveness scorer 25 and none of the other scorers 18-24, training can proceed as described above, albeit, with depth frames acquired by imaging each person approved for access, to be prevented from access or otherwise. In these embodiments, the depth frames and their processing in accord with steps 40-52 provides for both liveness detection and face recognition— that is, the liveness score represents not only that (i.e., the liveness of the face shown in the current depth frame) but, also, whether the face matches that of a known individual. Moreover, faces represented in the frames of the depth stream can be tracked across multiple frames, all as is within the ken of those skilled in the art in view of the teachings hereof.

Other Scorers

In addition to the scorers discussed above, embodiments of the invention can utilize a scorer that returns a measure of specularity of lights on faces in the video face, ranging from 0.0 to 1.0. Still other embodiments may use additional scorers within the ken of those skilled in the art in view of the teachings hereof. This may be instead of or in addition to those discussed above.

Frame Selector

In some embodiments, once scored by elements 18-24, frame selector 16 winnows frames received from the RGBD camera 12 so that only a subset are invoked for processing by face recognizer 26 and for liveness scoring, which can be more computationally-intensive steps. To that end, selector 16 selects a subset of the frames generated by camera 12 for application to and matching by face recognizer 26 and, then, to scorer 25. See Steps (C) and (F). In the illustrated embodiment, such winnowing/selection is based on the scores of each respective frame generated by scorers 18-24. In other embodiments, liveness scorer 25 operates in parallel with scorers 18-24 and their combined outputs are weighed together by selector 16 in determining frame selection, e.g., for application to recognizer 26.

Throughout the discussion in this section, the term "frame" refers to a corresponding pair of image and depth frames generated by camera 12, unless otherwise evident in context. Thus, for example, the selection of a video frame by selector 16 based on scores generated by (video) scorers 18-24 contemplates selection of the corresponding depth frame for subsequent processing by scorer 25.

Illustrated frame selector 16 generates, from the individual face, size, pose, blur and/or liveness scores generated in step (B), a composite score for each of the frames for which those scores were generated and, based on those composite scores, selects the corresponding frame for processing by the face recognizer 26 (and, in some embodiments, liveness scorer 25). In embodiments in which multiple such scores are generated in step (B), the composite score can be the multiplicative product of the individual scores for that frame. In embodiments in which only one such score (e.g., a liveness score) is generated for a frame, that score is the composite score. In other embodiments, the composite score can be computed by binning each individual score, assigning values to the respective bins, summing or multiplying those values, and normalizing the result. In other embodiments, machine learning based methods are used to automatically determine the composite score. In still other embodiments, other methods of compositing the individual frame scores can be used (ignoring the blur score, for example), all as is within the ken of those skilled in the art in view of the teachings hereof. As discussed below and otherwise evident to those skilled in the art in view of the teachings hereof, the composite score can be used to determine messaging (if any) to the individual/candidate, e.g., requesting that he/she reposition himself/herself, etc., to permit better image acquisition and recognition.

Frame selector 16 selects frames until a suitable plurality of them, M, having a threshold minimum composite score of k1 are identified in the illustrated embodiment, M has a value of seven, although, other embodiments may vary in this regard. In some embodiments, if a count, N (e.g., three or such other number as is implementation dependent), of the frames exceed a second, higher threshold, k2, the frame selector 16 can also deem a suitable number of frames to have been acquired, where k1>k2 and N<M.

In practice, achieving such a suitable plurality can sometimes take too long given the operational constraints placed on the implementation, the patience of the candidate individuals, and so forth. Accordingly, in some embodiments, the frame selector 16 applies the designated number of frames to the face recognizer 26 for recognition, e.g., if a watchdog or other timer (not shown) reflects that a designated time interval (e.g., 1 second, in the illustrated embodiment, although some embodiments may vary in this regard) has passed since the candidate user has presented him/herself for recognition—even if not all of those frames achieve the threshold minimum composite score. In such instances, the frame selector 16 can signal controller 28 of the shortcoming so that it may message display 32 or otherwise.

When the composite scores of the frames are too low, the controller 28 can also send messages to a display 30—which, too, can be an LED, LCD or other display of the type commercially available in the marketplace or otherwise known in the art—directing the candidate individual to take an action that will improve the scores of newly acquired frames. See step (G). To this end, the controller 28 can, for example, message the candidate individual via display 30 to adjust their position so that they appear bigger to the camera, to modify the pose of their head, to separate him/herself from other individuals, to remove sunglasses, caps, scarves or other accessories tending to obstruct facial imaging. Such messaging can be explicit, e.g., the display of a textual message, or implicit, e.g., blinking a dot on the screen near the camera, generating an arrow on the screen pointing to the camera, and so forth.

The thresholds k1 and k2 can be determined empirically or otherwise in view of the specifics of the implementation, and can be pre-set (e.g., at the time of installation) and, optionally, adjusted by an operator on a periodic, sporadic or other basis, if at all. In the illustrated embodiment, in which the scores generated in step (B) are each between zero and one, an exemplary value for k1 can be 0.7 and an exemplary value of k2 can be 0.9, though, other embodiments may vary in these regards. Those skilled in the art will appreciate that still more (or less) than two thresholds can be employed as, more generally, can other mappings from composite score to number of frames. Such mappings can be determined empirically by analyzing many images or access attempts performed on a test system, or other means within the ken of those skilled in the art.

In some embodiments, k1 and/or k2 are adjusted in real-time by the controller 28 based, e.g., on feedback from an operator rejecting faces that the system 10 has approved for access, on equipment or environmental conditions resulting in excessively long delays in identifying selectable frames, and so forth, all as within the ken of those skilled in the art in view of the teachings hereof.

Face Recognition

In embodiments in which face recognition is not performed by scorer 25, face recognizer 26 matches faces in the video frames selected by selector 16 against a database 26a or other store of images (collectively, referred to, here, without loss of generality as a "database") of designated individuals. These may be individuals approved for access, individuals to be prevented from access, or otherwise. The recognizer, which may be of the variety commercially available in the marketplace or otherwise known in the art, as adapted in accord with the teachings hereof, can perform such matching, e.g., by using a convolutional neural network to convert each facial image to a vector, and comparing those vectors using a distance such as a cosine distance, or by other techniques within the ken of those skilled in the art as adapted in accord with the teachings hereof.

A preferred such recognizer 26 is constructed an operated in the manner of the element referred to as the "Recognizer" shown and described in incorporated-by-reference U.S. patent application Ser. No. 16/679,021, e.g., at FIG. 2 and the accompanying text at pp. 15, et seq., the optimization of which Recognizer is further described in that application, e.g., at pp. 19, et seq., under the heading "Using the Tracker (FIG. 1 E) to optimize the Recognizer (FIG. 1 G)" and at pp. 21, et seq., under the heading "Theory of Using Multiple Images To Increase The Probability of Positive Identification" and at pp. 24, under the heading "Integrating Classifier Output Over Immediate Past for Making Identification Decisions," and code excerpts for all of which are provided at pp.

24, et seq., under the heading "Example," all of the foregoing of which, too, are incorporated herein by reference.

Referring to step (E), recognizer 26 of the illustrated embodiment outputs those distances to controller 28, labeled, here, "match." Vectors that are closer than a distance threshold are a match. If a face from a frame matches multiple images from the database 26A, it can either be discarded, or the closer vector can be selected. As there are multiple images, more advanced matching algorithms can be used that utilize lower distance (or other matching) thresholds, such as taught in incorporated-by-reference U.S. Ser. No. 16/679,021, e.g., in the section entitled "Using the Tracker (FIG. 1 E) to optimize the Recognizer (FIG. 1 G)" and in the accompanying drawing, all of the foregoing of which, too, are incorporated herein by reference.

Controller

Depending on the match scores and, specifically, whether they are above a distance threshold (or "low water mark") value that can be set empirically or otherwise by an operator, by automated operation of the controller 28 or otherwise, the controller 28 can actuate the security mechanism 34 as per convention in the art as adapted in accord with the teachings hereof. See Step (F). It can also send a message to the display 32—which can be an LED, LCD or other display of the type commercially available in the marketplace or otherwise known in the art—signaling a security guard or other operator that access was accepted or rejected, again as per convention in the art as adapted in accord with the teachings hereof. As noted above, Step (F) can include invoking the liveness scorer, e.g., once a face in a video stream captured by camera 12 has been recognized as a match against database 26a or other store of images.

The controller 28 of the illustrated embodiment returns results with a low error rate, when the composite scores for the frames applied to the recognizer 26 are above the threshold minimum composite score, k1. In instances (of the type described previously) when those composite scores are lower than that composite score threshold, the controller 28 may adjust the distance threshold (or low water mark minimum) so that positive matches are nearly always correct, though, negative matches can be suspect. In this circumstance, the controller 28 can message RGBD camera 12 to acquire more frames—though, in many embodiments, the camera, region selector, and scorers continue to run while the recognizer 26 is processing data so that if more frames are needed, they may be already collected.

A preferred controller 28 is implemented as a state machine, switching between several states as indicated, by way of non-limiting example along with respective state transitions, below:

1. Idle: Looking for the next face; waiting for a candidate to apply for access.
2. Tracking: Tracking a candidate in a region of interest near the access control point, but not yet submitted to the Recognizer
3. Identification In Progress: Selected Frames (16) from the frame selector have been submitted to the Recognizer (26). More frames are being collected to submit to the Recognizer if needed.
4. Waiting for tracking to end: The candidate has been rejected; waiting for them to leave the region of interest.
5. Waiting for Access Control (AC) Zone Cleared: The candidate has been accepted; waiting for them to leave the region of interest.

State Transitions:
(a) From Idle to Tracking: Detecting a new face in a selected frame, indicating a new candidate in the region of interest, and the face is not too large (See next transition).
(b) From Idle to Identification In Progress: Detecting a new face in a selected frame, indicating a new candidate, and detecting conditions for making final submission, e.g. the face is so large to indicate it is close to the access control point and thus a response is due quickly.
(c) From Tracking to Idle: The candidate has not been seen for sufficient number of frames to be considered lost, and not enough frames were collected for an initial submission of faces to the Recognizer (26).
(d) From Tracking to Identification In Progress: Detecting a face in a selected frame from an existing candidate, and either the (i) the composite score of the frames has stopped going up over a sufficient number of frames (5 is a reasonable number) or (ii) (i) the timer expired or (iii) the face is large indicating it is close to the access control point and thus a response is due quickly.
(e) From Tracking and from Identification In Progress to Waiting For Tracking End Receiving Access Denied event from the Recognizer.
(f) From Tracking and from Identification In Progress to Waiting For Zone Cleared: Receiving Access Granted from the Recognizer.
(g) From Waiting For Tracking End to Idle: The face, and therefore the candidate, is not seen for a sufficient number of frames to be considered lost.
(h) From Waiting For Zone Cleared to Idle: The face, and therefore the candidate, is not seen for a sufficient number of frames to be considered lost. Or, the candidate's face is so large as to be close enough to the access control point to be able to be ignored.

In addition to tracking and transitioning the states, the controller 28 controls operation of the system 10 in stopping or continuing to request more frames as follows:
(i) If sufficient number of frames (N, M) have been collected of the appropriate qualities (k1,k2), Grant Access if appropriate. If not, if the quality scores are still improving or the distances from the recognizer are decreasing, and the timer has not timed out, request more frames.
(ii) If the distances found are so high/row that a match is highly unlikely with sufficient number of frames, Deny Access/Grant Access immediately.
(iii) If a timer expires, and the distances currently found are too low, Deny Access.

In some embodiments, the controller 28 uses the following methodology to control messaging to the displays 30, 32 and to decide whether to signal the frame selector 16 to obtain more image and/or depth frames from the scorers 18-25. This can be based on information provided by the scorers 18-24 via bus, network or other coupling (software or hardware), all as will be evident to those skilled in the art in view of the teachings hereof.

Controller Messaging:
If desirable to collect more frames, optionally show messaging on the display including:
Is the person too far?
If they are too far and not moving closer, show a message to move closer
Is the person too close?
Show a message to move farther back.
Is the person very blurry?
Tell the person to stand still.

Is the person looking to the side or up or down?
Tell the person to look at the camera
Control of Frame Collection:
Collected at least N frames with minimum quality score above k2?
If yes:
If the composite scores aren't changing, done collecting frames.
If the composite scores are changing significantly
If out of time, done.
If not out of time, collect more frames.
If no, go to next step
Otherwise: Collected at least M frames with a minimum quality score above k1?
If yes, Are the frame quality scores improving:
If yes:
If not out of time, collect more frames.
If out of time, done.
If no:
If the composite scores aren't changing, collecting frames is done.
If the composite scores are changing significantly
If out of time, done.
If not out of time, collect more frames
If did not collect at least M frames, go to the next step.
Otherwise, at least M frames with a minimum quality score above k1 were not collected.
If not out of time, collect more frames.
If out of time, reject candidate access.
Not enough good data was collected to verify the person, and that might be because of a spoof attempt (e.g., someone is shining a light on the sensor to try and break it.)

Controller 28 of the illustrated embodiment need not wait for the recognizer 26 to finish processing frames to put up a message on display 30. Instead, it can respond to scores received from scorers 18-25 to generate such messages. For example, if controller 28 receives a message from the scorer 18 indicating that there is more than one person in the region selected by selector 14, it can immediately generate a message via display 30 directing the candidate individual to separate himself from others. (In embodiments that permit group access, the results of the face scorer can be ignored in this regard, though, a standard, off-the-shelf tracker may be required as part of the scorer to group scores together for the same face and, in such instance, the recognizer 26 would attempt to recognize all people in the group and respond accordingly).

As noted above, the number of images collected by the frame-selector 16 can be varied under control of the controller 28. The first goal is to collect fewer frames when possible, which minimizes the time required to access. The second goal is to collect more frames should it appear that more frames might succeed in creating a match.

In some embodiments, e.g., as discussed below, the controller 28 receives the output of the recognizer 26 for an initial (e.g., small) batch of frames, for example, only one or two frames. If the controller 28 determines there is a match, then liveness scorer 25 can be invoked and/or security mechanism 34 unlocked without waiting for further frames to be collected. If the controller 28 determines that after the initial batch of frames there is no match, more frames can be requested from the frame selector 16 to potentially achieve a match. There are numerous criteria for the controller 28 to stop requesting frames. By way of non-limiting example, those criteria include: when a match is found resulting in an acceptance, when the distances returned by the recognizer 26 are sufficiently extreme that they are unlikely to improve resulting in a rejection, when a certain number of frames is collected (e.g. 7), or when a certain amount of time has elapsed.

In some embodiments, a timer is employed to gauge the candidate's speed of approach to an access point. In such embodiments, it may be beneficial for the controller to stop requesting frames in order to insure that it can make the necessary computations to provide a result in time for the candidate, if approved, to enter the access point, e.g., without breaking stride. For this variation, by way of non-limiting example, the system 10 can estimate the candidate's distance from the access point (e.g., using interocular distance or head size or otherwise) and, potentially, speed of approach, and can cease requesting frames in time to decide whether to approve or reject the candidate just prior to his/her time of reaching the access point. Other mechanisms for determining when to cease acquiring frames can be used instead or in addition (e.g., calibrating the system empirically based on trial and error). An additional criterion for the controller 28 to stop requesting frames is based on the change over time of the scores from the scorers 18-25. If those scores have stopped increasing, then the distances from the recognizer 26 will generally also stop increasing. That is, if a match is not found by the controller 28 and the distance to a match is a sufficient far, and the scores from the scores 18-25 have stopped increasing, then a candidate individual can be rejected. Conversely, if the scores improve sufficiently within a certain amount of time, then the controller 28 may request more frames to see if a match is formed. Note that, as an optimization, the frame-selector may choose to ignore frames where scores from the scores 18-25 are insufficiently different from previous frames, so that only frames whose scores have increased sufficiently are processed. This type of selection yields computational savings.

The scores from the scorers capture the cause of the majority of the variations in the distances from the recognizer 26, but not all of those variations. The remaining variations can be treated as noise, which some distances being a bit smaller and some a bit larger. Using that information, an additional criterion for the controller 28 to stop requesting frames is based on the change over time of the distances from the recognizer 2). If the distances are large enough or small enough, the controller 28 can safely accept or reject. In an in-between range, the controller 28 can collect more images. The noisy distances can potentially yield a distance from the recognizer 26 that will yield a match.

In a slight variation, the frame selector 16 can accept all frames after an initial quality is met. By way of non-limiting example, the initial condition might be that the candidate individual is large enough in the frame, and the pose quality is high enough. The controller 28 receives the output of the recognizer. If the controller determines there is a match, then access may be granted via security mechanism 34. If the controller determines there is no match, rather than rejecting the individual, the controller controls the frame selector 16 and the recognizer 26 to process more frames. If the scores from the scores 18-25 do not improve after a certain number of frames, or a certain amount of time, the candidate individual is rejected.

In practice, a controller 28 uses multiple of the above criteria. By way of non-limiting example, if the scores from the scorers 18-24 are improving, or the distance from the recognizer 26 are becoming closer to a match, more frames may be collected.

In some embodiments, it was noted there are circumstances where using standard tracking algorithms to associate faces in frames to the same candidate individual, tracking by tracking faces, typically done using face detection. It will be appreciated by those with skilled in the art that one can use other sorts of detectors, which without limitation includes a head detector, a body, or a body detector and a face detector together. A body detector may be particularly useful because a camera may not be able to see the face of a candidate individual at all times.

In many circumstances, the face recognition is completed before the liveness detector is completed. That may happen, for example, that the face recognition can use images farther away from the detector. But more generally, the requirements of face recognition and liveness are different. Here is an example of a controller that can be used after the recognition is complete, but the liveness detection is not. First, for messaging the user:

Controller Messaging after Recognition is Complete:
  If more frames are needed, and the timer has not expired, we can optionally show messaging on the display including:
    Does the person need to reposition? If so, message the person to reposition.
      That includes but is not limited to: move closer, move farther away, move-left, move-right, move head down, move head up.
    Is the person need to adjust their head pose (e.g. they are not looking at the camera), then message the person to adjust their pose.
    Is the person very blurry? If so, tell the person to stand still.
    Is the person in too much sunlight and data is being lost? If so, typically moving closer to the camera will improve the situation, and message the person to move closer to the camera.
Controller: Frame Collection (after Recognition is Complete):
  The frame collection for liveness detection is nearly identical to the frame collection for facial recognition, though the counts of frames desired and the minimum quality scores are different:
    Collected at least N frames with minimum quality score above k2, or at least M frames with a minimum quality score above k1?
    If yes:
      If the spoof scores aren't changing, done collecting frames.
      If the spoof scores are changing significantly and run out of time, done.
      If there is more time, collect more frames.
    If no, go to next step.
  If run out of time, reject access. (Not being able to obtain good quality data to verify the person is live, and that might be because of a spoof attempt (e.g. someone is shining a light on the sensor to try and break it.) In this case, the controller can message the use they may try again and fix the quality.

Additional Embodiments

Additional embodiments of access control systems and methods of the type described above use a depth camera 12 made from a stereo pair of cameras, from which depth frames can be created, and point clouds computed. In such embodiments, the cameras can both be in the visible light range (e.g. RGB) or one or more could have one or more channels in the infrared range. Rather than producing a depth image directly, the pair of cameras produces a pair of images. As is within the ken of those skilled in the art, the cameras can be calibrated in the factory or after installation using standard methods to compute focal lengths, relative position, angles and distortions. For example, in one such embodiment, the two cameras are identical (i.e have the same focal lengths, pointing in the same direction), and are spaced apart horizontally. This configuration has advantages including reducing compute to determine depth, as is within the ken of those skilled in the art.

As described previously, in step 42 depth point clouds can be computed from those images using the calibration information and standard methods. For example, fiducials can be computed and matched in both images to create a cloud of depth points, and regularization is used to compute points in between. As another example, a neural network can be used to take the two images as inputs and compute a disparity image, which can then be used to compute a depth map. The depth map and disparity maps need not be computed on the entire image; they can be computed only in the regions around the faces.

Such disparity maps and therefore depth maps, can be computed from coarse to fine, for example using the techniques described in Wang, et al, "Anytime stereo image depth estimation on mobile devices," in Proc. of the IEEE International Conference on Robotics and Automation, 2019, the teachings of which are incorporated herein by reference, e.g., as implemented in the publicly available AnyNet open source project (e.g., at mileyan.github.io/anynet/, the teachings of which are also incorporated herein by reference) or otherwise, or newer variants of similar algorithms that compute disparity. The course to fine strategy is advantageous in that range checking, step 44, can be done more quickly, saving additional compute when an image is out of range. Similarly, liveness algorithms can examine the coarse data and potentially make decisions based on the coarse data, producing faster results.

As is within the ken of those skilled in the art, one can also train a network to predict per-pixel confidences on the disparity or depth map. This data can be used as part of the liveness scorer 25, or "Other Scorers". A simple way to use the confidence is to count the fraction of pixels on a face that have a confidence above a threshold. That threshold can be determined empirically or otherwise. The result depth image can have those pixels removed, resulting in missing data, which can be handled in the methods described above for producing and processing point clouds.

Disparity maps are closely related to depth maps. In some embodiments, disparity maps are used directly instead of point clouds. In the case of cameras with parallel optical axes, there is a straightforward relationship from disparity to depth maps.

One can train a perceptron (also called neural network) to take the disparity map and get a liveness score. Generally, such a network would be specific to a camera setup, and only work within a specific depth range. Given that the embodiment already has range checking, and many systems can be deployed using the same camera pair setup, such a limitation may be acceptable.

Note that to train a perceptron can require a significant amount of data. One way to help do that is by using simulators for both true faces and for spoof attempts to generate the data.

One can furthermore train a perceptron to take as an input the two images from the stereo camera of the face, and produce a liveness score directly. Since a perceptron can be trained to compute a disparity map, and another perceptron can be trained to produce the liveness score, the two perceptrons can be merged to create an end-to-end perceptron that takes the two images of a face and produces a liveness score. The end result can be a perceptron that does not directly compute disparity or depth maps. In this case range checking remains important. Depth can be computed by the network as a separate output, or just approximated by the width/height of the head in the two images. As above, liveness scores from multiple images can be weighted to get an overall score.

As previously discussed, if one of the channels from the camera is infrared, or an infrared channel is available, one can similarly train perceptrons on depth images (or disparity images) and a temperature/infrared image. In such a system, statues, and/or people wearing silicone masks of other people's faces may be detected. If working with point clouds, the temperature image can be converted to vector by histogramming or other methods, and fed into an svm, perceptron, or other machine learning method.

Described herein are embodiments of the invention meeting the objects set forth above. It will be appreciated that these are merely examples of the invention and that other embodiments may incorporate changes to those herein within the ken of those skilled in the art. Thus, for example, it will be appreciated that although displays 30 and 32 for messaging the candidate individual and operator, respectively, are shown here separately, they may, in fact, comprise one and the same display. Moreover, although, those displays 30, 32 are used in the illustrated embodiment for messaging, alternate embodiments may perform messaging through bells, lights, whistles, and so forth.

In view of the foregoing, what we claim is:

1. A method of access control, comprising
   A. receiving one or more frames ("depth frames") of a depth image stream acquired by a depth camera,
   B. creating a point cloud from a said depth frame
   C. generating a liveness score of a candidate individual represented in the depth frame from a vector that is based on geometric characteristics of point-wise neighborhoods within said point cloud, and
   D. wherein the step of generating the liveness score from the vector includes applying the vector to a machine learning algorithm.

2. The method of claim 1, wherein the geometric characteristics are functions of eigenvalues of the point-wise neighborhoods.

3. The method of claim 1, wherein the vector characterizes the respective depth frame and surface contours of a face of the candidate individual represented therein.

4. The method of claim 1, comprising actuating an electro-mechanical, magneto-mechanical, optical-mechanical or other security mechanism, thereby, permitting (or preventing) the candidate individual access to a secured room, facility or other resource.

5. The method of claim 1, wherein the geometric characteristics include any of sphericity, linearity, planarity and local surface variation.

6. The method of claim 1, including a step of range-checking to determine if the candidate individual is within the working range of the depth camera.

7. The method of claim 1, comprising binning the point cloud to reduce resources necessary to generate from it the liveness score.

8. The method of claim 1, comprising generating eigenvalues of neighborhoods of points in the point cloud or in the binned point cloud.

9. The method of claim 1, comprising generating the vector by concatenating counts in each of the bins of the histograms with one another.

10. The method of claim 1, in which the step of generating the liveness score includes generating that score to represent not only liveness of the face shown in the respective depth frame but, also, to represent whether the face matches that of a known individual.

11. The method of claim 1, comprising
    generating liveness scores for each of multiple depth frames, and
    computing an average or other statistical measure of multiple liveness scores.

12. The method of claim 1, comprising performing facial recognition on one or more frames of a video stream that corresponds to the depth stream and that includes one or more images the candidate individual.

13. The method of claim 1, comprising messaging the candidate individual if the liveness score of a frame is in a designated range.

* * * * *